United States Patent Office 3,540,979
Patented Nov. 17, 1970

3,540,979
LAMINATES OF SIMILARLY CONSTITUTED FILMS OF DIFFERENT CRYSTAL STRUCTURE
James K. Hughes, Bartlesville, Okla., assignor to Phillips Petroleum Company, a corporation of Delaware
No Drawing. Filed July 11, 1966, Ser. No. 563,984
Int. Cl. B32b 27/08; C09j 5/00
U.S. Cl. 161—252                                    9 Claims

ABSTRACT OF THE DISCLOSURE

A laminate comprises at least two films made from polymer differing in crystal structure, one of said films having predominantly hexagonal crystals and the other having predominantly monoclinic crystals. The different crystal structures can be produced by utilizing certain selected nucleating agents which result in the formation of monoclinic crystals on rapid quenching and the formation of the hexagonal crystals on slower quenching.

---

This invention relates to laminates formed from polypropylene films and the process for making those laminates.

Heretofore plastic films have been used to make all-plastic shipping bags and similar flexible side containers; however, it was found that, in general, in order to obtain shipping bags of adequate strength, the plastic film or films from which the bags were made had to be biaxially oriented. By biaxial orientation is meant plasticly deforming the film at a temperature below its melting point and in two directions, e.g. parallel to the longitudinal axis of the film and substantially perpendicular to that longitudinal axis. Biaxial orientation and methods for achieving same are known in the art, for example, see the volume of the Reinhold Plastic Applications series entitled "Polypropylene" by T. O. J. Kresser, published by the Reinhold Publishing Corporation, New York, 1960, page 122 et seq.

Normally shipping bags and similar articles when formed from plastic are formed using heat sealing techniques to joint various parts of the plastic film to form the bag.

It was found that a single, biaxially oriented film tends to pucker when heat sealed because the heating process causes uneven biaxial shrinking of the film. In order to obviate puckering of the biaxially oriented film upon heat sealing, biaxially oriented laminates of films of polypropylene and lower melting polyethylene were used. However, in biaxially orienting a film or a laminate the edges thereof are gripped in order to stretch the laminate transversely as or before it is stretched longitudinally. The gripped edges of the laminate or film are deformed by this gripping action and must be trimmed from the final biaxially oriented product. Because the prior art laminate is formed from polyethylene and polyproylene, and because the laminate is formed so that the polyethylene and polypropylene films cannot be separated (laminates generally being formed by fusing the various films together), only a limited amount of the trimmed material can be used for making new laminates. This is so because recycle of all the trimmed material would result in the polyethylene content of the new laminates growing too large. Therefore, much of the trimmed material for laminates using polyethylene and polypropylene films must be discarded and therefore is a total waste.

It has now been found that a biaxially oriented laminate that will not pucker when heat sealed can be formed entirely from polypropylene films if at least one film used to form the laminate is composed of crystalline polypropylene containing a major amount of hexagonal crystals, and at least one other film used to form the laminate is composed of crystalline polypropylene containing a major amount of monoclinic crystals.

Therefore, the laminates of this invention are formed only from polypropylene films, at least one of the films containing crystalline polypropylene wherein the crystals are in hexagonal form and at least one of the other films containing crystalline polypropylene wherein the crystals are monoclinic.

Because the laminates of this invention contain no polyethylene or polymers other than polypropylene, all the trimmed material can be reused to make new laminates and there is no waste at all. Further, because the laminates of this invention are formed entirely from polypropylene, better bonds are obtained between the various polypropylene films used to make the laminate and not only is a stronger laminate, and therefore ultimately a stronger shipping bag and the like, formed, but the laminate resists delamination much better than laminates formed from polymers of different monomers.

It has further been found that nucleated polyproylene, i.e. crystalline polypropylene wherein a finely divided material (nucleating agent) is uniformly dispersed therein prior to cooling of same from the molten state so that a larger amount of smaller spherulites are formed because of the presence of the nucleating agent thereby providing a crystalline polymer that contains a large number of small crystals, will in some circumstances, depending upon the specific nucleating agent employed, have a preponderance of its crystals in the hexagonal form. Also, this hexagonal form of polypropylene crystals has been found to have a melting point of about 18° C. below the melting point of the monoclinic form. The formation of hexagonal crystals will depend on specific nucleating agents employed.

It has further been found that nucleated polypropylene films containing a preponderance of hexagonal crystals can be used in making a laminate with other nucleated or nonnucleated polypropylene films which have a preponderance of monoclinic crystals.

It has further been found that a polypropylene film nucleated with agents that promote the formation of hexagonal crystals rather than monoclinic crystals, when cooled from the molten state, will produce hexagonal crystals when cooled in a quenching medium at a temperature substantially above 80° C., and will produce monoclinic crystals when more rapidly cooled in a quenching medium that is maintained at a temperature no higher than 80° C. Thus, by differentially quenching a single nucleated polyropylene film, films of two different crystallographic structures are obtained and these films can be used to make a laminate. The laminate then can, because of the difference in melting points of the films, be biaxially oriented and thereafter heat sealed without puckering.

Accordingly, it is an object of this invention to provide a new and improved method for making laminates of polypropylene film. Another object of this invention is to provide a new and improved polypropylene laminate.

Other aspects, objects, and the several advantages of this invention will be apparent to those skilled in the art from the description and appended claims.

Polypropylene normally tends to crystallize in monoclinic form because that form is at the lowest free energy state, and is thus conventionally referred to as the alpha form. However, polypropylene nucleated with certain agents and then cooled from the melt state in a conventional nucleation process tends to produce hexagonal crystals (beta form) rather than monoclinic crystals. Thus, crystalline polypropylene having a preponderance of hexagonal crystals, i.e. at least 50 percent of the crystals are in the hexagonal form, can be made by dispersing in the polypropylene from about 0.05 to about 5, preferably from about 0.1 to about 2, weight percent, based on the total weight of the polymer, of a nucleating agent that preferentially causes the formation of hexagonal crystals rather than monoclinic crystals. Such nucleating agents include sodium phthalate, calcium phthalate. Not all nucleating agents promote the formation of hexagonal crystals, but, on the contrary, most nucleating agents presently appear to promote the formation of monoclinic crystals. For example, phthalic acid, sodium benzoate, aluminum benzoate, lithium benzoate, magnesium benzoate, and the like all preferentially promote the formation of monoclinic crystals rather than hexagonal crystals.

Polymer nucleation techniques are known in the art as evidenced by the Society of Plastics Engineers Journal, the October 1964 volume, pages 1113 through 1119, and therefore will not be discussed in detail. However, in general, polypropylene is nucleated by either melt or dry blending the polypropylene with the particulate, e.g. powdered, nucleating agent or agents. Thereafter, the polymer is usually extruded (in the form of filaments which are quenched) and chopped into pellets.

The polypropylene films employed in making the laminates of this invention, depending upon the manner in which they are made, will contain a preponderance of either monoclinic or hexagonal crystals. At least one film containing a preponderance of hexagonal crystals is laminated to at least one film containing a preponderance of monoclinic crystals by any conventional lamination process. For example, the films can be heat sealed to one another by superimposing one film on the other, heating the composite to the fusion temperature of the two, and then pressing the two together by passing the heated composite between a pair of rolls. Lamination processes are known widely and therefore will not be discussed herein in detail.

The laminated product is then oriented in any conventional manner and to any degree, including monoaxial orientation, biaxial orientation, and the like. In orienting the laminate, it is first heated to a temperature below its melting point but sufficiently elevated to cause softening of same and then stretched in one or more directions to cause plastic deformation of same. The stretched laminate is thereafter cooled to ambient temperatures. Depending upon the particular materials used in the laminate, it can be heated to a temperature of from about 120 to about 320° C. and then stretched. Generally, the laminate will be stretched so that the ratio of its stretched length to its original unstretched length is at least about 4 to 1 and preferably at least 6 to 1.

When making the laminates of this invention, at least one exposed surface of the final laminate should be composed of the lower melting point polymer, i.e. the film composed of polypropylene having a preponderance of hexagonal crystals, so that the laminate will be heat sealable in that the exposed, lower melting surface can be melted while in contact with another polymer surface to cause fusion of those surfaces without causing the higher melting polymer in the laminate to soften. For example, when a laminate is formed from three polypropylene films, it is preferred that a film having a preponderance of monoclinic crystals be sandwiched between two films having a preponderance of hexagonal crystals.

Generally, the crystalline film employed in this invention will contain at least 50 weight percent based upon the total weight of the film of crystals be they monoclinic, hexagonal, or both.

Although both nucleated and non-nucleated polypropylene film can be employed so long as one film contains a preponderance of hexagonal crystals and one other film contains a preponderance of monoclinic crystals, it is presently preferred to employ substantially all nucleated films. These nucleated films can be obtained by nucleating polypropylene with a nucleating agent that promotes the formation of hexagonal crystals in a manner as discussed hereinabove, and then cooling two separate portions of the melted, nucleating agent containing polypropylene at two different rates. If one portion of the polypropylene containing the nucleating agent is cooled relatively slowly by quenching same in a medium such as water which is maintained at a temperature substantially above 80° C., preferably at least 90° C., polypropylene containing a preponderance of hexagonal crystals is formed. If the other portion of the polypropylene containing the same nucleating agent in the same amount is more rapidly cooled such as by quenching in a medium such as water which is maintained at a temperature no higher than 80° C. and preferably at room temperature, that polypropylene portion will have a preponderance of monoclinic crystals. Thus, the same polypropylene can be formed into two separate polypropylene films each film having a different crystallographic structure, and these films can then be used to make the laminate of this invention.

Although the invention has been described above with reference to polypropylene, it is to be understood that this invention is applicable to homopolymers and copolymers of propylene, the copolymers of propylene utilizing as monomers at least one other mono-1-olefin having 2 or 4 to 8 carbon atoms per molecule, inclusive. The copolymers of propylene applicable to this invention should contain at least 50 weight percent, based upon the total weight of the copolymer, of propylene.

The crystallographic structure of polypropylene used in the following examples and the proportion of crystals of any given crystallographic structure were both determined by X-ray diffraction techniques well known in the art. A copper target was used, with a ½° divergent slit and a 1° receiving slit, and with a focusing monochromator.

Melting points of the different crystallographic forms of polypropylene used in the following examples were determined by differential thermal analysis (DTA) using a Perkin-Elmer Differential Scanning Calorimeter. A nitrogen atmosphere and a sample heating rate of 20° C. per minute are used.

EXAMPLE I

Polypropylene having a melt flow (ASTM D 1238–62T, Condition L) of about 5 was prepared using a hydrogen-modified diethylaluminum chloride-$TiCl_3 \cdot \frac{1}{3} AlCl_3$ catalyst. Portions of the polymer fluff were blended with 0.2 weight percent of several nucleating agents in acetone slurry in a Waring Blendor, dried, milled in a Bradbender Plastograph, molded, and analyzed by X-ray diffraction. All samples were cooled at a rate of about 20° C. per minute, i.e. they were cooled slowly. The results indicate that a monoclinic structure is obtained without nucleating agent and with some of the nucleating agents, but that other nucleating agents give a predominantly hexagonal structure:

| Run No. | Nucleating agent | Predominant crystal structure |
|---|---|---|
| 1 | None | Monoclinic. |
| 2 | Na phthalate | Hexagonal. |
| 3 | Ca phthalate | Do. |
| 4 | Mg benzoate | Monoclinic. |
| 5 | Li benzoate | Do. |
| 6 | Al benzoate | Do. |
| 7 | Na benzoate | Do. |

EXAMPLE II

The melting point of another portion of the polypropylene of Runs 1 and 2 of Example I was determined by DTA:

| Run No. | Nucleating agent | Major melting point, °C. |
|---|---|---|
| 8 | None | 163 (monoclinic). |
| 9 | Na phthalate | 145 (hexagonal). |

These results show the considerable difference in melting point of the hexagonal and monoclinic crystal forms of polypropylene.

EXAMPLE III

Portions of the nucleated polypropylene of Example I, Run 2, were pelletized, molded into 1 mil films and quenched at the indicated temperature to obtain the indicated crystal structure:

| Run No. | Quench temperature, °C. | Predominant crystal structure |
|---|---|---|
| 10 | 100 | Hexagonal. |
| 11 | 90 | Do. |
| 12 | 79 | Monoclinic. |
| 13 | 52 | Do. |

EXAMPLE IV

Polypropylene prepared using a hydrogen-modified diethylaluminum chloride-TiCl$_3$·⅓AlCl$_3$ catalyst and having a melt flow (ASTM D 1238–62T, Condition L) of about 5 is dry blended in particulate form with 0.2 weight percent, based on the total weight of the polypropylene, of sodium phthalate. The mixture is then melt extruded into a 5 mil thick film using an extrusion temperature of about 450° F. Part of the extruded film is quenched on a chill roll which is maintained at a temperature below 80° C. and another portion of the extruded film is steam quenched. A three-layer laminate is formed using the chill roll quenched film as the center layer and the steam quenched film as the two outer layers by heating the three films in contact with one another to a temperature of about 145° C., pressing the films against one another, and thereafter cooling the thus-formed laminate substantially to room temperature.

The laminate is then biaxially oriented by heating the laminate to about 135° C., stretching the laminate parallel to its longitudinal axis and also gripping the laminate along its edges and stretching same transverse to the longitudinal axis so that the stretched dimension of the laminate in both stretching directions is about 6 times that of its original unstretched length. The laminate after orientation is steam quenched.

The laminate is heat sealable at temperatures of 150 to 160° C. without loss of orientation and without puckering of same. All the material trimmed from the laminate because of deformation of same by the gripping action during the orientation process is recycled to the extrusion process to be formed into new film. The laminate is not only readily heat sealable without puckering but is also quite strong and readily resists any delamination.

EXAMPLE V

Polypropylene having a melt flow (ASTM D 1238–62T, Condition L) of about 5 is prepared using a hydrogen-modified diethylaluminum chloride-TiCl$_3$·⅓AlCl$_3$ catalyst. A portion of the polymer is melt blended with 0.2 weight percent calcium phthalate, based upon the total weight of the polypropylene, and is formed into a 5 mil thick film by extrusion and cutting of blown tubing. The nucleated film is crystalline and a preponderance of the crystals are in the hexagonal form as determined by X-ray diffraction. A portion of the non-nucleated polypropylene whose crystals are predominantly monoclinic as determined by X-ray diffraction is formed into a 5 mil thick film by extrusion and cutting of blown tubing.

A three-layer laminate is formed using the non-nucleated film as the center layer and two nucleated films as the outer layers. The laminate is formed by pressing the films together while heated to a temperature of about 230° C.

Thereafter the laminate is biaxially oriented in the same manner as set forth in Example I.

The oriented laminate is strong and resists any delamination attempts. All trimmed material is returned to the film forming process to be made into new nucleated film.

EXAMPLE VI

A copolymer of propylene and ethylene containing about 97 weight percent propylene, based on the total weight of the copolymer, is prepared using the catalyst of Example I and has a melt flow (ASTM D 1238–62T, Condition L) of about 4. The copolymer is dry blended with 0.2 weight percent sodium phthalate, based upon the total weight of the copolymer. By DTA the copolymer is found to have a major melting peak of 133° C., which is substantially below the melting point of monoclinic polypropylene crystals, i.e. about 163° C., thereby indicating that the predominance of the crystals in the copolymer are of the hexagonal form.

The copolymer is formed into film by extrusion methods substantially the same as that for Example II and the copolymer film is formed into a 3-layer laminate using a non-nucleated homopolymer of Example II as the center layer and the lamination process of Example II.

The resulting laminate is readily heat sealable at temperatures in the range of from about 133 to about 160° C. and resists hand delamination attempts. All trimmings therefrom are recycled to the copolymer nucleation process because of the small amount of ethylene present in the copolymers.

Reasonable variations and modifications are possible within the scope of this disclosure without departing from the spirit and scope thereof.

I claim:

1. In a method for making a laminate suitable for biaxial orientation and heat sealing with substantially no puckering, the improvement comprising forming the laminate from at least two films formed from polymers selected from the group consisting of homopolymers of propylene and copolymers of propylene with at least one mono-1-olefin having 2 or 4 to 8 carbon atoms per molecule, inclusive, said copolymer having at least 50 weight percent based on the total weight of the copolymer of propylene, at least one of said at least two films being crystalline and having at least 50 percent of the crystals in a hexagonal form, at least one of said at least two films being crystalline and having at least 50 percent of its crystals in the monoclinic form, and at least one of said at least two films containing hexagonal crystals being exposed on at least one surface of said laminate, said film with hexagonal crystals containing about 0.05 to about 5 weight percent of the total weight of the polymer to which it is added of at least one of sodium phthalate and calcium phthalate, both of said films being formed from the same polymer.

2. The method according to claim 1 wherein said at least two films are formed from homopolymers of propylene, said at least one hexagonal crystal containing film having substantially all of its crystals in the hexagonal form, and said at least one monoclinic crystal containing film having substantially all of its crystals in the monoclinic form, said crystalline films having at least 50 weight percent thereof formed from crystals.

3. The method according to claim 1 wherein both of said films contain said about 0.05 to about 5 weight percent of said at least one of sodium phthalate and calcium phthalate, at least one of said at least two films having been cooled in a quenching medium maintained at a temperature no higher than 80° C., at least one of said at least two films having been cooled in a quenching medium maintained at a temperature substantially above 80° C., at least one of said films is quenched at a temperature greater than 80° C. being exposed on at least one surface of said laminate.

4. The method according to claim 4 wherein said nucleating agent is sodium phthalate and is present in an amount of from about 0.1 to about 2 weight percent based on the total weight of the polymer to which the nucleating agent is added, said at least two films are formed from homopolymers of propylene, said at least one hexagonal crystal containing film having substantially all of its crystals in the hexagonal form, said at least one monoclinic crystal containing film having substantially all of its crystals in the monoclinic form, the crystalline films containing crystals in an amount of at least 50 weight percent based upon the total weight of the film, and the at least one film that is quenched at a temperature substantially above 80° C. is quenched at a temperature of at least 100° C.

5. The method according to claim 4 wherein said nucleating agent is calcium phthalate and is present in an amount of from about 0.1 to about 2 weight percent based on the total weight of the polymer to which the nucleating agent is added, said at least two films are formed from homopolymers of propylene, said at least one hexagonal crystal containing film having substantially all of its crystals in the hexagonal form, said at least one monoclinic crystal containing film having substantially all of its crystals in the monoclinic form, the crystalline films containing crystals in an amount of at least 50 weight percent based upon the total weight of the film, and the at least one film that is quenched at a temperature substantially above 80° C. is quenched at a temperature of at least 100° C.

6. A biaxially orientable, heat sealable laminate comprising at least two films joined to one another over substantially their entire contiguous surfaces and formed from polymers selected from the group consisting of homopolymers of propylene and copolymers of propylene with at least one mono-1-olefin having 2 or 4 to 8 carbon atoms per molecule, inclusive, said copolymers having at least 50 weight percent, based on the total weight of the copolymer, of propylene, at least one of the surface films having a prepondenance of hexagonal crystals, and at least one of said films having a preponderance of monoclinic crystals.

7. The laminate according to claim 6 wherein said film containing a majority of hexagonal crystals also contains a nucleating amount of a nucleating agent selected from the group consisting of sodium phthalate and calcium phthalate.

8. The laminate according to claim 7 wherein said nucleating agent is sodium phthalate and is present in an amount of from about 0.05 to about 5 weight percent based on the total weight of the polymer to which the nucleating agent is added, said at least two films are formed from homopolymers of propylene, said at least one hexagonal crystal containing film having substantially all of its crystals in the hexagonal form, said at least one monoclinic crystal containing film having substantially all of its crystals in the monoclinic form, the crystalline films containing crystals in an amount of at least 50 weight percent based upon the total weight of the film.

9. The laminate according to claim 8 wherein said nucleating agent is calcium phthalate and is present in an amount of from about 0.1 to about 2 weight percent based on the total weight of the polymer to which the nucleating agent is added, said at least two films are formed from homopolymers of propylene, said at least one hexagonal crystal containing film having substantially all of its crystals in the hexagonal form, said at least one monoclinic crystal containing film having substantially all of its crystals in the monoclinic form, the crystalline films containing crystals in an amount of at least 50 weight percent based upon the total weight of the film.

References Cited
UNITED STATES PATENTS

| | | | |
|---|---|---|---|
| 2,719,100 | 9/1955 | Banigan | 161—252 |
| 3,207,736 | 9/1965 | Wijga. | |
| 3,207,739 | 9/1965 | Wales. | |
| 3,246,061 | 4/1966 | Blatz. | |
| 3,268,499 | 8/1966 | Wales. | |
| 3,367,926 | 2/1968 | Voeks. | |
| 3,380,868 | 4/1968 | Moser | 156—306 X |

JOHN T. GOOLKASIAN, Primary Examiner

C. B. COSBY, Assistant Examiner

U.S. Cl. X.R.

156—306; 161—166; 260—88.2, 93.7, 94.9